June 23, 1970  S. A. GRAY  3,517,360
ELECTROMAGNETIC FORCE MOTOR HAVING LINEAR
OUTPUT CHARACTERISTICS
Filed July 14, 1966

INVENTOR.
SAMUEL A. GRAY
BY
Nilsson Robbins & Anderson
ATTORNEYS

United States Patent Office 3,517,360
Patented June 23, 1970

3,517,360
ELECTROMAGNETIC FORCE MOTOR HAVING LINEAR OUTPUT CHARACTERISTICS
Samuel A. Gray, Sun Valley, Calif., assignor to Bell Aerospace Corporation, a corporation of Delaware
Filed July 14, 1966, Ser. No. 565,237
Int. Cl. H01f 7/13; H02k 33/16
U.S. Cl. 335—230
11 Claims

ABSTRACT OF THE DISCLOSURE

An electromagnetic force motor having a frame, annular coil, a pair of permanent magnet polarized pole pieces, a pivotable armature within the coil and pole pieces, and a plurality of discrete sections of material in the magnetic circuit that saturate at different levels of magnetic flux density. The discrete sections may be in the pole piece faces, between the permanent magnets and the frame, or on that part of the armature between the pole pieces. The cross sectional areas of the discrete sections are chosen so that the force output is linearly proportional to the input signal to the coil.

Background of the invention

This invention relates generally to magnetic translating devices and more particularly to electromagnetic force motors which utilize an armature movably positioned in an air gap and which is caused to move responsively to input electrical signals, such movement varying the width of the air gap. More specifically, this invention relates to electromagnetic force motors in which the force generated by the motor is linearly proportional to the input signal current applied to the force motor.

The use of force motors in the prior art has long been known. One example of the utility of force motors is in the positioning of the pilot valve such as a flapper or spool of a hydraulic servo valve. The force motor in such applications is used as an element of a control system and is adapted by its operating characteristics to convert an electrical input signal into a desired mechanical position of the spool valve. The present invention is particularly useful in such applications although it has a wide veriety of other uses such, for example, as in automatic control systems for industrial machinery.

In various of the prior art applications of such electrical force motors it has long been desirable to provide such force motors for these various applications which bear a linear relationship to the applied input signal and wherein the force exerted upon the armature remains substantially linear as it approaches the pole faces. This permits displacing the armature over the entire gap.

Many prior art schemes have been tried to accomplish such linearization. For example, such schemes as reducing the cross-section of a part of the armature and keeping that portion always saturated magnetically, such for example as illustrated in U.S. Pat. No. 3,071,714. Another example of such linearization schemes is to provide recesses in the face of the armature and a plurality of mating teeth in the face of the pole piece, such for example as shown in U.S. Pat. No. 2,930,945. Most common of the prior art practices has been merely to utilize extremely large force motors for the particular job to be accomplished in such a manner that the force motor would be operated only over the linear part of the input current versus force curve which is a very small portion of the total curve. Each of these schemes has certain obvious disadvantages in that large signal input currents are required to effect operation, thus wasting power, lowering efficiency, creating excess weight, or the like.

Accordingly it is an object of the present invention to provide an electromagnetic force motor having a substantially linear force response over the entire input signal current range.

It is another object of the present invention to provide an electromagnetic force motor having a substantially linear response curve and which force motor is substantially lighter in weight than prior art devices producing the same output force for input signal current.

It is another object of the present invention to provide an electromagnetic force motor having a substantially linear response curve which provides a greater usable force than prior art force motors of the same or similar size.

It is yet another object of the present invention to provide an improved electromagnetic force motor which for any given output force is smaller in size as well as being lighter in weight than a comparable prior art electromagnetic force motor.

Additional objects and advantages of the present invention both as to its organization and method of operation will become apparent from a consideration of the following description taken in conjunction with the accompanying drawing in which:

Summary of the invention

An electromagnetic force motor constructed in accordance with the present invention includes apparatus having a pair of spaced-apart pole pieces with an armature positioned therebetween. A magnetic circuit is included in the force motor and includes the pole pieces and the armature. Electrical signal receiving means is operatively associated with the magnetic circuit to establish a magnetic flux therein and there is included in such force motor apparatus for maintaining a substantially constant force versus input signal characteristics and such apparatus includes: a plurality of discrete sections of magnetically saturable material disposed in the magnetic circuit. Each of these discrete sections of material has a different level of magnetic flux density at which it becomes magnetically saturated in response to the application of magnetic flux thereto.

Description of the embodiment

Figure 1:
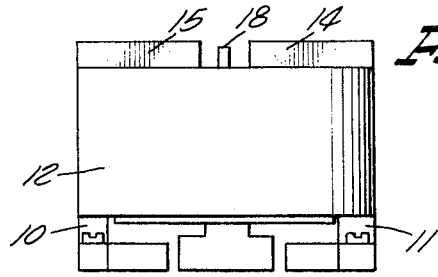
FIG. 1 is a side elevational view of an electromagnetic force motor utilizing the present invention.
Figure 2:
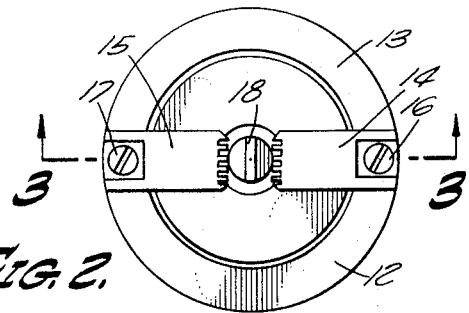
FIG. 2 is a top elevational view of the apparatus illustrated in FIG. 1.
Figure 3:
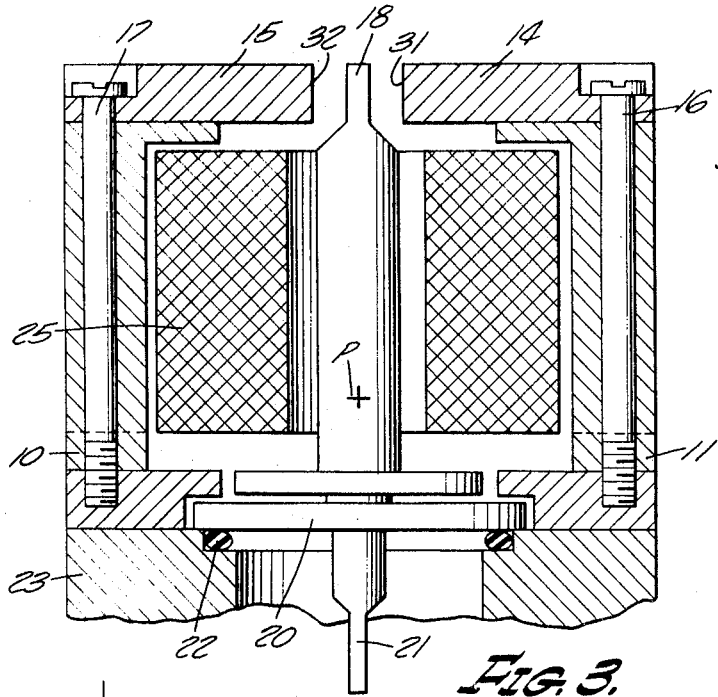
FIG. 3 is a cross-sectional view taken about the lines 3—3 of FIG. 2.

Referring now to the drawing and more particularly to FIGS. 1 through 3 thereof, there is illustrated an electromagnetic force motor constructed in accordance with the present invention. Such a force motor includes a frame member 11 having a pair of permanent magnets 12 and 13 affixed thereto in any manner or means known to the art, such for example as by brazing. At the upper surface of the frame members there is affixed a pair of pole pieces 14 and 15. The pole pieces 14 and 15 are adjustable by way of loosening the attaching bolts 16 and 17 respectively and adjusting the position of the pole pieces 14 and 15 until they are of the desired relationship to the armature 18 disposed in the air gap formed between the faces of the pole pieces 14 and 15. The armature 18 is supported upon a support member 20 and may have any desired structure such for example as an elongated tube which is pivoted about a pivot point P to thereby position a flapper 21 which is used to control the position of a servo valve spool as above referred to. The mounting means 20 may be sealed by means of a conventional O ring 22 to the base 23 as is well known in the prior art. Positioned about the armature 18 is a coil 25 which is adapted to receive electrical input signals which, in turn, cause the armature to take a physical position depending upon the strength of the applied input signal and the polarity thereof.

Figure 4:
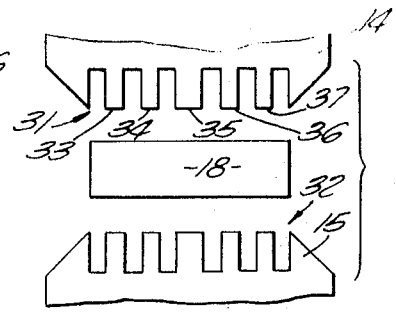
FIG. 4 is an enlarged view of a portion of the apparatus illustrated in FIGS. 1 through 3.
Figure 5:
FIGS. 5 and 6 are curves illustrating operating characteristics of an electromagnetic force motor constructed in accordance with the present invention.

As is more particularly shown in FIG. 2 and in detail in FIG. 4 the pole faces of the pole pieces 14 and 15 are arranged to provide a substantially linear force versus signal current characteristic to the electromagnetic force motor in accordance with the present invention. By particular reference to FIG. 4 it should be noted that the pole faces 31 and 32 of the pole pieces 14 and 15 each have provided therein a plurality of discrete sections such, for example, as shown at 33 through 37 on pole face 31, each of which is constructed of a magnetically saturable material. It should also be noted that each of the discrete sections 33 through 37 has a different size and therefore a different area since as will become apparent from FIG. 3 the thickness of each of the pole faces is the same. It should also further be understood that the polarizing flux provided by the permanent magnets 12 and 13 is not sufficient to drive any of the discrete sections 33 through 37 into magnetic saturation when the armature is centered. As is well known in the prior art, when no electrical signal is applied to the coil 25 the armature 18 is positioned centrally between the pole faces and is balanced so that there is no mechanical output signal. However, upon the application of an electrical signal to the coil 25 such, for example, as to polarize the upper portion of the armature 18 as a south-magnetic pole and assuming that the pole piece 14 is magnetized to be a north magnetic pole, then the armature 18 moves toward the pole face 31. As this movement occurs, the flux density between the armature 18 and the pole face 31 increases. As the flux density increases the magnetically saturable material in the discrete sections 33 through 37 sequentially become saturated in a predetermined manner. As the flux density begins to increase, that discrete section having the smallest cross-sectional area, is the first driven into saturation and then each of the sections progressively greater in cross-sectional area goes sequentially into magnetic saturation. This predetermined sequence is illustrated, for example, in FIG. 5 showing that upon the application of the current signal the flux density present in the pole face 31 increases as the armature 18 approaches the pole face 31. As the flux density approaches the first arbitrary point such as that shown at 41, the discrete section, for example, at 34 has reached saturation and therefore no longer has any capability of increasing the pulling force on the armature 18. As the armature, however, continues to approach the pole face 31, a second flux level such as that shown at 42 is reached at which, for example, the section 33 goes into magnetic saturation. This produces somewhat of a stairstep type curve which, however, by the proper selection of cross-sectional areas of magnetically saturable material at the pole face 31 is substantially linear as is illustrated in FIG. 5.

Figure 6:
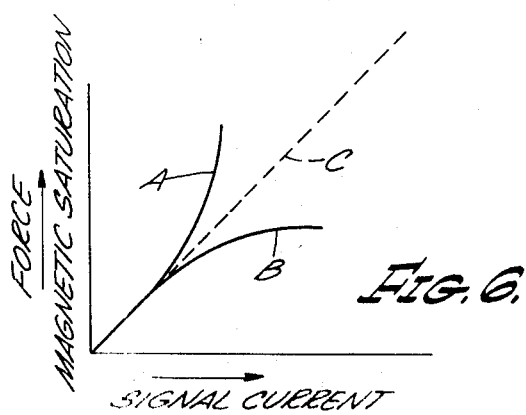

As an additional manner of illustrating the principle upon which the present invention is based, reference is now made to FIG. 6 which is a graph illustrating force and magnetic saturation on the ordinate and input signal current on the abscissa. Curve A represents the typical force curve of prior art electromagnetic force motors showing the non-linear relationship of the force to the input signal current. Curve B on the other hand represents the overall magnetic saturation of the various sections of the pole face 31 superimposed over the curve A. By adding these two curves A and B one then obtains curve C shown in dotted line which is a substantially linear signal current versus force relationship.

Figure 7:
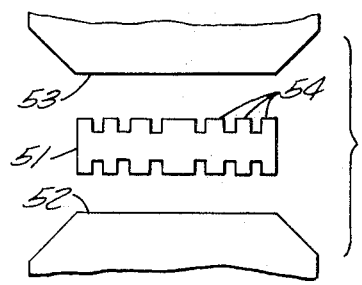
FIG. 7 is an enlarged fragmentary view of a portion of an alternative embodiment of an electromagnetic force motor constructed in accordance with the present invention.

It will be of course obvious to those skilled in the art that the various discrete sections of magnetically saturable material need not necessarily be disposed in the pole faces but may be disposed in the armature as is illustrated in FIG. 7. As is therein shown, the armature 51 is again positioned between the pole faces 52 and 53. However, in this instance the armature has disposed thereon a plurality of sections 54 of magnetically saturable material, each having a different cross-sectional area in a path taken normal to the lines of magnetic flux so that each of the areas saturate at a different point as above described.

Figure 8:
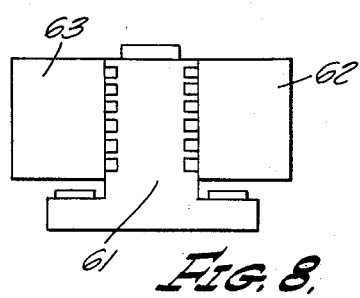
FIG. 8 is a side elevational view of yet another alternative embodiment of an electromagnetic force motor constructed in accordance with the present invention.

A similar alternative arrangement is shown in FIG. 8 but in this instance the magnetically saturable material is positioned at the interface between the frame 61 of the electromagnetic force motor and the permanent magnets 62 and 63.

In each of the alternative embodiments of an electromagnetic force motor constructed in accordance with the present invention it should be recognized that the magnetic circuit has inserted therein a dynamically varying reluctance the value of which depends upon the flux density present in the magnetic circuit. As the flux density increases, the reluctance also increases thus causing the force to which the armature is subjected to be substantially linear. It has also been discovered that by utilization of the structure in accordance with the present invention the fringing flux normally present at the force motor gaps chances much less with the position of the armature than has heretofore been the case. Thus the overall efficiency of the electrical force motor in accordance with the present invention is substantially increased. By utilization of magnetically saturable material disposed within the pole face in accordance with the present invention and as above described, the force output of a typical electromagnetic force motor at a given input current, has been increased by a factor of at least 3.

What is claimed is:
1. In an electromagnetic force motor having a pair of pole pieces spaced apart to provide an air gap therebetween; an armature positioned with a portion thereof in said air gap, said armature being adapted to move in said air gap from a neutral position thereby more closely approaching one of said pole pieces; a magnetic circuit in said torque motor including said pole pieces, said armature and a permanent magnet means, said permanent magnet means providing polarizing flux; electrical signal means operatively associated with said magnetic circuit to establish magnetic flux therein of a strength proportional to a received electrical signal; the improvement of apparatus for maintaining a substantially constant force versus input signal characteristic comprising:
 a plurality of discrete sections of magnetically saturable material disposed in said magnetic circuits, each such section being magnetically saturable at a predetermined level of magnetic flux density, the levels of magnetic flux density at which each of said plurality of discrete sections of materials magnetically saturate being different, thereby varying the reluctance of said magnetic circuit proportional to the flux density present therein, said polarizing flux from said permanent magnet means being insufficient to magnetically saturate any of said plurality of discrete sections.

2. An electromagnetic force motor as defined in claim 1 in which said plurality of discrete sections are positioned within said armature.

3. An electromagnetic force motor as defined in claim 1 in which said plurality of discrete sections are positioned within said pole pieces.

4. An electromagnetic force motor as defined in claim 3 in which the faces of said pole pieces are each grooved to define said plurality of discrete individually saturable sections.

5. An electromagnetic force motor as defined in claim 1 which further includes a frame member positioned adjacent said permanent magnet means, said discrete sections of material being disposed in said magnetic circuit at the interface between said frame member and said permanent magnet means.

6. An electromagnetic force motor as defined in claim 2 which further includes abutting frame member and permanent magnet means in said magnetic circuit and additional discrete sections of magnetically saturable material disposed in one of said frame member and said permanent magnet means.

7. An electromagnetic force motor as defined in claim 1 wherein each of said plurality of discrete sections has a different cross-sectional area in a plane disposed substantially normal to the lines of magnetic flux, that discrete section having the smallest cross-sectional area magnetically saturating first, sequentially followed in magnetic saturation by each discrete section successively larger in cross-sectional area.

8. An electromagnetic force motor as defined in claim 2 wherein each of said plurality of discrete sections has a different cross-sectional area in a plane dispose substantially normal to the lines of magnetic flux, that discrete section having the smallest cross-sectional area magnetically saturating first, sequentially followed in magnetic saturation by each discrete section successively larger in cross-sectional area.

9. An electromagnetic force motor is defined in claim 3 wherein each of said plurality of discrete sections has a different cross-sectional area in a plane disposed substantially normal to the lines of magnetic flux, that discrete section having the smallest cross-sectional area magnetically saturating first, sequentially followed in magnetic saturation by each discrete section successively larger in cross-sectional area.

10. An electromagnetic force motor as defined in claim 5 wherein each of said plurality of discrete sections has a different cross-sectional area in a plane disposed substantially normal to the lines of magnetic flux, that discrete section having the smallest cross-sectional area magnetically saturating first, sequentially followed in magnetic saturation by each discrete section successively larger in cross-sectional area.

11. An electromagnetic force motor as defined in claim 3 which further includes abutting frame member and permanent magnet means in said magnetic circuit and additional discrete sections of magnetically saturable material disposed in one of said frame member and said permanent magnet means.

References Cited

UNITED STATES PATENTS

| | | | |
|---|---|---|---|
| 2,575,153 | 11/1951 | Wightman. | |
| 2,694,781 | 11/1954 | Hinz | 310—261 X |
| 2,718,614 | 9/1955 | Gamble | 335—229 |
| 2,930,945 | 3/1960 | Weathers et al. | 335—230 |
| 2,962,611 | 11/1960 | Atchley | 310—29 |
| 3,071,714 | 1/1963 | Hadekel | 335—227 |
| 3,329,916 | 7/1967 | Carson | 310—29 X |
| 3,381,150 | 4/1968 | Trbovich | 310—29 |
| 2,832,908 | 4/1958 | Abbott | 310—266 X |

FOREIGN PATENTS

| | | |
|---|---|---|
| 88,683 | 6/1960 | Denmark. |
| 93,147 | 8/1955 | Netherlands. |

WARREN E. RAY, Primary Examiner

U.S. Cl. X.R.

310—30